United States Patent [19]

Miles

[11] Patent Number: 4,892,034

[45] Date of Patent: Jan. 9, 1990

[54] CORN CUTTER AND CREAMER

[76] Inventor: Charles B. Miles, 4551 Woodland Brook Dr., Atlanta, Ga. 30339

[21] Appl. No.: 264,982

[22] Filed: Oct. 31, 1988

[51] Int. Cl.4 .............................................. A47J 17/00
[52] U.S. Cl. ..................................... 99/567; 30/121.5; 99/537
[58] Field of Search ................. 99/567, 568, 539, 537; 130/9 C, 9 D, 9 A, 9 R; 30/121.5

[56] References Cited

U.S. PATENT DOCUMENTS 2,282,660  5/1942  Lee ........................................ 99/567

Primary Examiner—Timothy F. Simone
Attorney, Agent, or Firm—Charles S. McGuire

[57] ABSTRACT

A utensil for cutting kernels from an ear of corn and thereafter extracting the cream from the cob. A cutting blade extends through an opening in the lower portion of a U-shaped trough, whereby an ear of corn may be manually drawn back and forth through the trough and the kernels will be cut from the cob and pass through the opening into an underlying receptacle. A second blade is removably inserted through laterally aligned openings in the trough wall and has a scraping edge over which the cob is drawn to extract the liquid which also passes downwardly through an opening in the bottom of the trough, into the receptacle below.

3 Claims, 1 Drawing Sheet

CORN CUTTER AND CREAMER

BACKGROUND OF THE INVENTION

This invention relates to kitchen tools, or utensils and more particularly, to a kitchen tool used to cut kernels of fresh corn from the cob and optionally to extract the creamy liquid from the same cob, thus being termed a corn cutter and creamer.

In the preparation of fresh corn for cooking, canning, freezing, etc., the kernels may be cut from the cob by means of a knife or other form of cutlery. It is also often desirable to extract the liquid from the cob and any portions of the kernels remaining thereon to combine with the kernels for both the added flavor and nutritional value. When cutting corn from the cob with an ordinary kitchen knife it is difficult to insure that the kernels are completely cut from the cob, yet avoid cutting off pieces of the cob which become mixed with the cut kernels. Also, cutting corn from the cob in this manner is a relatively slow process. Although various forms of food processors have been devised, some of which are suited to cut corn from the cob, such mechanisms tend to be expensive and complicated in design.

It is, therefore, a principal object of this invention to provide a novel corn cutter and creamer that is simple and economically constructed, as well as durable and reliable in operation.

Another object of this invention is to provide a corn cutter and creamer that utilizes entirely stationary blades and other non-moving parts to remove the corn and to provide optional removal of cream from the corn cob.

Still another object of this invention is to provide a corn cutter and creamer that is so mounted on supporting structure as to permit a bowl or pan to be placed under the blade structure in order to receive the cut corn and the cream of the corn and cob.

A further object is to provide a simple, manually operated corn cutter and creamer which is rapid and safe in operation, permitting many ears of fresh corn to be processed in a relatively short time without substantial danger of cuts or other injury to the operator.

Other objects will in part be obvious and will in part appear hereinafter.

DETAILED DESCRIPTION

The preferred embodiment of this invention comprises a corn supporting trough 5 extending along a linear axis and having a U-shaped lateral cross section. Each end of the trough rests upon one of spaced and parallel upright members 6, the lower ends of which are fixedly connected to horizontally disposed, rectangular member 7. A bowl or pan may be placed on member 7 to receive the kernels and cream as the ear of corn and cob are moved horizontally back and forth through trough 5, as explained later.

Figure 2:
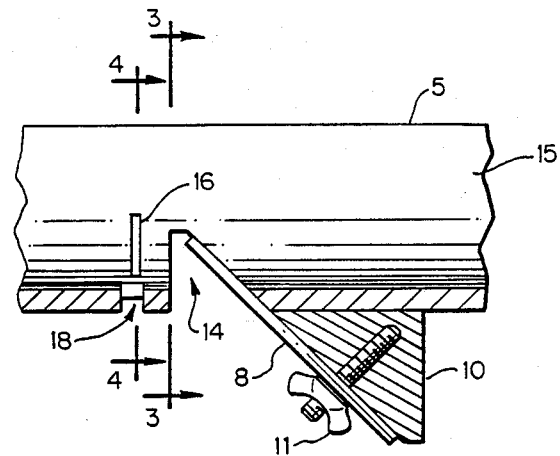
FIG. 2 is a fragmentary, sectional view of a central portion of the cutter and creamer, taken along the longitudinal axis thereof.
Figure 1:
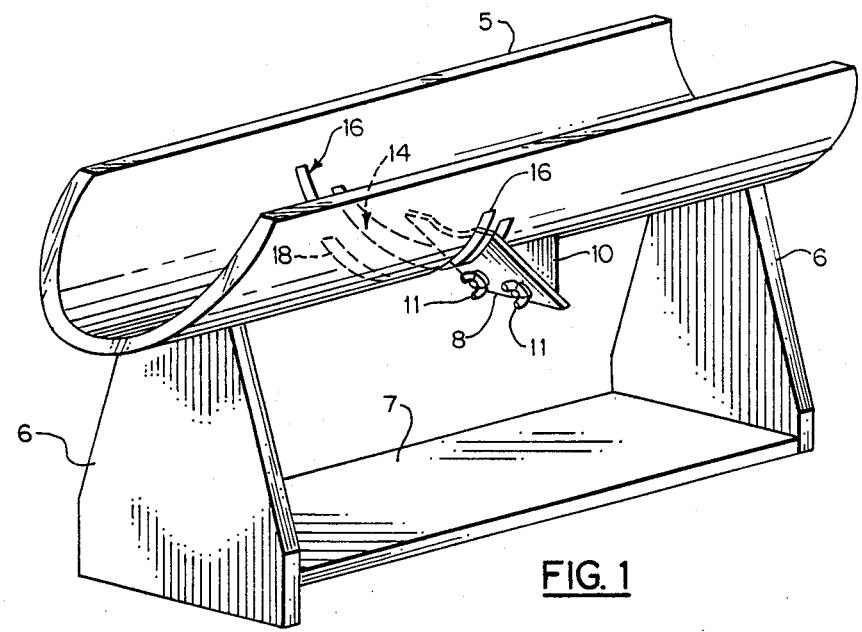
FIG. 1 is a perspective view of the cutter and creamer of the invention.
Figure 3:
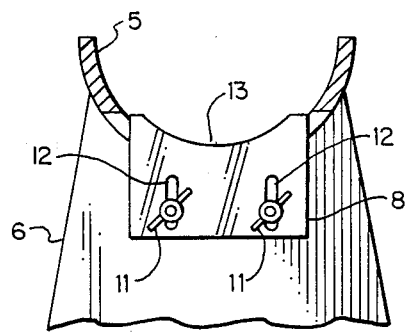
FIG. 3 is a cross-sectional view of the cutter and creamer taken along line 3—3 of FIG. 2.
Figure 4:
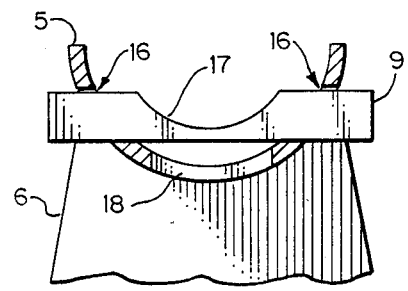
FIG. 4 is a cross-sectional view, similar to that of FIG. 3, taken on the line 4—4 of FIG. 2.

The position of corn cutting blade 8 is shown in FIG. 1–3 of the drawing, where it is seen to project upwardly at an angle from its supporting block 10 to which it is adjustably secured by a pair of laterally spaced wing nuts 11, threaded onto respective studs, each anchored in block 10 and passing through an elongated opening 12 in the aforesaid cutting blade 8. Cutting blade 8, a rectangular piece of flat stainless steel having a concave cutting edge 13, projects upwardly at a predetermined angle through the opening 14 that is located in the lower portion of trough 5. In addition to opening 14, wall 15 of trough 5 is provided with a pair of vertically disposed, laterally aligned openings 16 in each side thereof. The purpose of openings 16 is to permit the creamer blade 9 to be slid into place to extend across the interior of trough 5 when one desires to obtain the cream from the corn cob and any portions of the kernels which may remain thereof. The otherwise rectangular creamer blade 9 is also provided with a concave scraping edge which is indicated in FIG. 4 of the drawing by the reference numeral 17.

In operation, blade 8 is adjusted to extend a desired distance into trough 5, corresponding approximately to the size or depth of the kernels to be cut from the ears of corn at hand, and creamer blade 9 is removed so that an ear of corn may lie substantially flat on the lower, inside surface of trough 5. The ear of corn is then moved manually back and forth over blade 8, being rotated with each forward and reverse pass, whereby the kernels are cut from the ear by cutting edge 13 and pass through opening 14 into a bowl, or the like, (not shown) on base member 7. After the kernels are cut from one or more in those instances when it is desired to process cream corn rather than whole-kernel, creamer blade 9 is inserted through openings 16 to be positioned laterally across the trough, as seen in FIG. 4. The cobs are then drawn back and forth over concave edge 17 of blade 9, again being rotated with each pass, the scraping action of the cob over the blade serving to remove the creamy liquid from the cob. The cream flows downwardly through opening 18 in the lower side of the trough into the same bowl containing the previously cut kernels.

From the above description of the construction of this invention it will be seen that there is herein provided a corn cutter and creamer that will not only remove the corn from approximately 12 ears of corn in 10 minutes, but it can also be used to remove the liquid which is used to make cream corn without the necessity of adding any other ingredients. The corn cutting blade can be adjusted upon its support to accommodate ears of corn having kernels of different sizes. The creamer blade is not in place as the kernels are cut from the cob, but may be quickly and easily inserted in laterally spaced openings without the necessity of manipulating any fastening means.

What is claimed is:

1. Apparatus for cutting kernels of corn from a cob and optionally extracting cream from said cob, said apparatus comprising:
    (a) an elongated trough extending along a linear axis and having an essentially uniform, U-shaped cross section perpendicular to said axis providing laterally spaced side walls on opposite sides of a bottom wall having a concave inner surface;

(b) support structure including a pair of parallel, upright members each fixedly attached to said trough adjacent opposite ends thereof to hold said trough with said axis substantially horizontal and said side walls extending upwardly, and a horizontally disposed member extending between and fixedly attached to each of said upright members adjacent the lower ends thereof, said substantially disposed member having an upwardly disposed surface adapted to support an open container below said trough;

(c) at least one lower opening extending through said bottom wall and having upper edges in said side walls of said trough;

(d) a first blade having a relatively sharp, concave, cutting edge;

(e) a support block fixedly attached to said trough on the outer surface of said bottom wall adjacent said lower opening;

(f) means securing said first blade to said support block with said blade extending through said lower opening and said cutting edge disposed laterally across said trough above said concave inner surface, said securing means permitting selective positioning of said cutting edge between minimum and maximum distances above the plane of said inner surface;

(g) a second blade having a relatively dull, concave, scraping edge;

(h) a pair of laterally aligned side openings extending through said side walls, said second blade and said side openings being respectively dimensioned for freely sliding movement of said second blade through said side openings to removably support said second blade upon said trough above said lower opening with said scraping edge extending laterally across said trough and spaced above the plane of said inner surface by a distance greater than said maximum distance, whereby a cob with the kernels removed may be drawn over said scraping blade when the latter is positioned in said side openings to remove the cream from said cob without contacting said first blade cutting edge.

2. The apparatus of claim 1 wherein said first blade is supported in angular relation to said trough axis with said cutting edge disposed toward one end of said trough, and said side openings are positioned between said first blade and said one end.

3. The apparatus of claim 2 wherein said lower opening is divided into first and second, separate, lower openings, said first blade extending through said first opening to allow kernels out from an ear of corn as it is moved from said one end toward the other end of said trough to fall through said first opening, and said second opening being positioned directly below said side openings to allow cream scraped from the cob after removal of the kernels as it is moved over said scraping edge to pass through said second opening.

* * * * *